United States Patent [19]

Shekleton et al.

[11] Patent Number: 4,993,220

[45] Date of Patent: Feb. 19, 1991

[54] AXIAL FLOW GAS TURBINE ENGINE COMBUSTOR

[75] Inventors: Jack R. Shekleton, San Diego; Ken W. Sawyer, Escondido, both of Calif.

[73] Assignee: Sundstrand Corporation, Rockford, Ill.

[21] Appl. No.: 384,164

[22] Filed: Jul. 24, 1989

[51] Int. Cl.[5] .......................... F02C 7/00; F23R 3/16
[52] U.S. Cl. ..................................... 60/39.36; 60/737
[58] Field of Search ...................... 60/39.36, 737, 738, 60/758, 760, 756, 755

[56] References Cited

U.S. PATENT DOCUMENTS

| | | |
|---|---|---|
| 3,088,279 | 5/1963 | Diedrich .......................... 60/39.36 |
| 3,266,250 | 8/1966 | Freeman et al. ..................... 60/751 |
| 3,285,006 | 11/1966 | Freeman et al. ..................... 60/751 |
| 3,333,414 | 8/1967 | Saintsbury . |
| 3,671,171 | 6/1972 | Doyle . |
| 4,171,614 | 10/1923 | Weller . |
| 4,314,443 | 2/1982 | Barbeau .......................... 60/39.36 |
| 4,339,925 | 7/1982 | Eggmann et al. . |
| 4,429,527 | 2/1984 | Teets . |
| 4,545,196 | 10/1985 | Mozgia et al. . |

FOREIGN PATENT DOCUMENTS 1219287  6/1966  Fed. Rep. of Germany ...... 60/39.36

Primary Examiner—Louis J. Casaregola
Assistant Examiner—Timothy S. Thrope
Attorney, Agent, or Firm—Wood, Phillips, Mason, Recktenwald & VanSanten

[57] ABSTRACT

Improved combustor volume in turbine engines without an increased engine envelope is accomplished in an engine 10 have a radial compressor 12, an axial turbine 16, and a radial combustor 20 in which a generally radial flow path extends between a compressed air inlet 30 and a turbine nozzle 22 for gases of combustion produced by combusting fuel introduced through a fuel injector 34 with air introduced through the compressed air inlet 30.

20 Claims, 2 Drawing Sheets

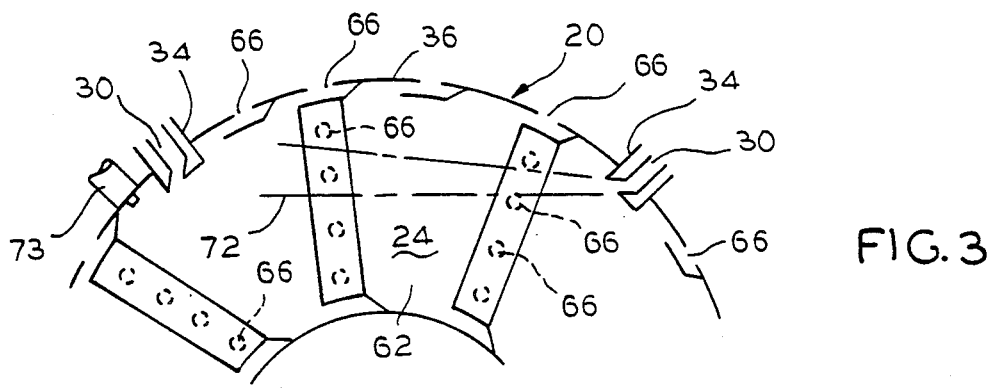
FIG. 3
FIG. 3a
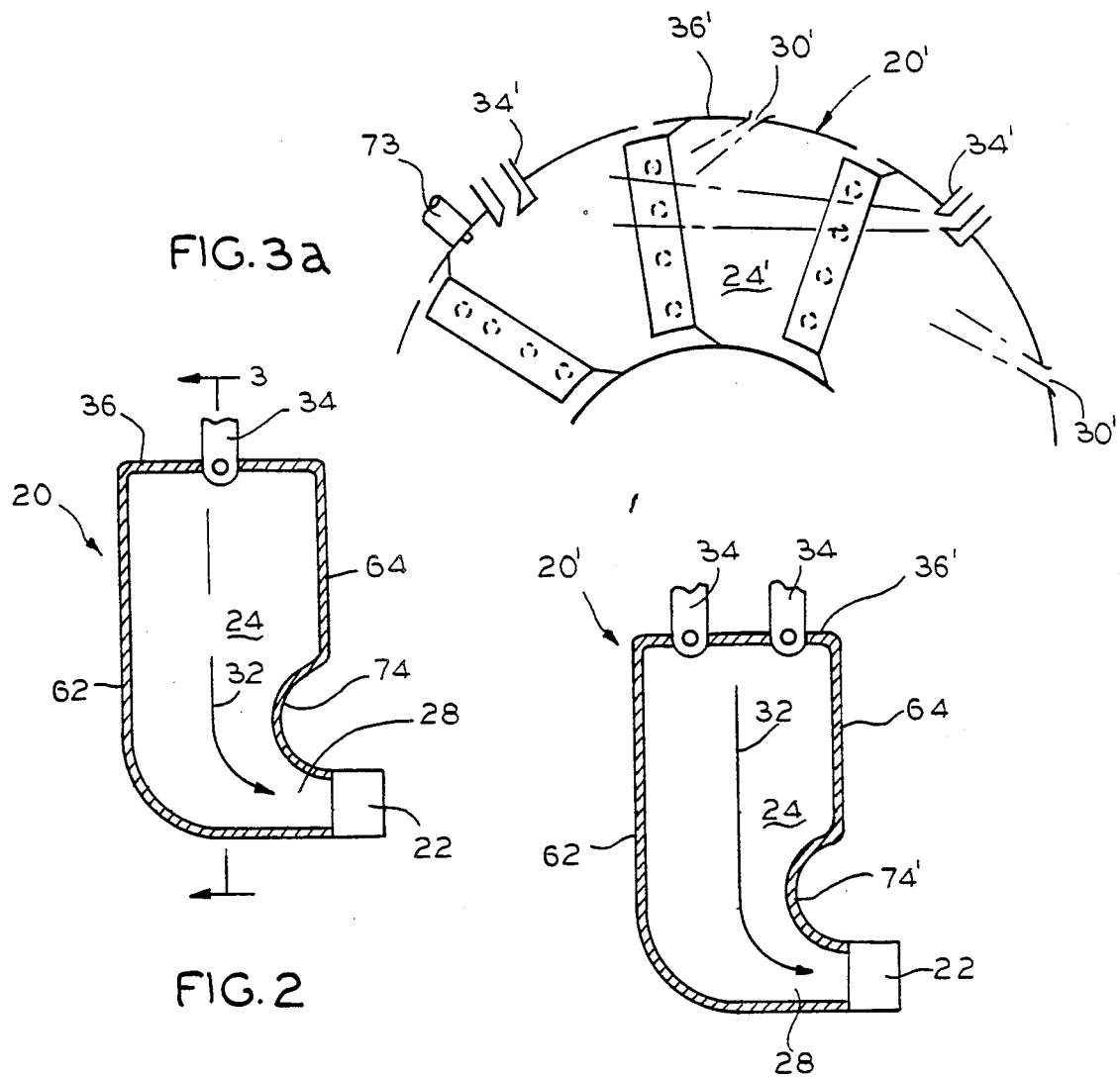
FIG. 2
FIG. 4

AXIAL FLOW GAS TURBINE ENGINE COMBUSTOR

FIELD OF THE INVENTION

This invention relates to gas turbine engines and, more particularly, to axial flow gas turbine engine combustors.

BACKGROUND OF THE INVENTION

In many applications, gas turbine engines are known to utilize reverse flow combustors for generating hot gases therein. In such combustors, the gases of combustion must reverse their direction flow approximately 180 degrees before being applied to the turbine wheel. As a result, the "g" forces are generally perpendicular to the direction of air flow.

By reason of the direction of the "g" forces, there is an undesirable interference with the aerodynamics of the air/fuel mixture. It would, thus, be desirable to avoid such aerodynamic interference by in some way avoiding an arrangement wherein the "g" forces are perpendicular to the direction of flow through the combustor. Still more specifically, it would be highly desirable to provide a combustor wherein the "g" forces are in the same direction as flow through the combustor.

However, while so doing, it must be kept in mind that the combustor must have a sufficient volume to achieve a satisfactory performance level. At the same time, there should not be any increase in engine envelope or overall weight. Still further, a reduction in the number of fuel injectors and the overall weight of the engine would be desirable to reduce cost.

The present invention is directed to overcoming one or more of the above problems.

SUMMARY OF THE INVENTION

It is the principal object of the invention to provide a new and improved turbine engine having enhanced operational reliability. More specifically, it is an object of the invention to provide a new and improved axial flow gas turbine engine having a radial combustor with a generally radial flow path therethrough. It is a further object of the invention to provide a turbine engine in which the "g" forces act on the gases in the combustor in the direction of flow.

An exemplary embodiment of the invention achieves the foregoing objects in a gas turbine engine having radial compressor means for compressing air entering through a compressor inlet opening for delivery to radial combustor means. The engine also includes axial turbine means in axially spaced relation to the radial compressor means with the radial combustor means intermediate the two and wherein the radial compressor means is operatively associated with the axial turbine means for driven movement thereby. Still further, the engine includes turbine nozzle means for directing gases of combustion to the axial turbine means and fuel injection means operatively associated with the radial combustor means radially outwardly of the turbine nozzle means.

In a preferred embodiment, the radial combustor means defines a radial combustion space in communication with both the radial compressor means and the turbine nozzle means. It will also include means for introducing compressed air into the radial combustion space, for instance, a compressed air inlet or inlets preferably integrally associated with the fuel injection means and radially outwardly of the turbine nozzle means, the last-mentioned of which is advantageously disposed radially inwardly of the radial combustion space to define a generally radial flow path from the radial combustion space to the turbine nozzle means. With this arrangement, the radial combustor means is adapted to generate the gases of combustion by combusting fuel from a source and air from the radial compressor means.

Additional details of the radial combustor means include a pair of axially spaced radially extending walls joined at radially outward extremes by a generally cylindrical wall wherein the fuel injection means is mounted for injecting fuel from the source and air from the radial combustion means generally tangentially into the radial combustion space. The radially extending walls advantageously define a necked down region at radially inward extremes adjacent the turbine nozzle means, and the radial combustor means advantageously includes means for introducing dilution air into the radial combustion space upstream of the turbine nozzle means to cool the gases of combustion. More specifically, the means for introducing dilution air into the radial combustion space includes a plurality of dilution air inlets in the cylindrical wall and the radially extending walls whereas the compressed air inlet or inlets are advantageously integral with the fuel injection means for introducing compressed air together with fuel into the radial combustion space for combustion therein.

In a highly preferred embodiment, the fuel injection means comprises a plurality of fuel injectors mounted in circumferentially spaced relation in the generally cylindrical wall. The circumferentially spaced fuel injectors are disposed in a common plane extending generally perpendicular to an axis of the radial combustor means and the tangential injection provides good circumferential mixing with far less than the normal number of fuel injectors. If desired, the fuel injectors may be disposed in two planes which are axially spaced and parallel and both of which extend generally perpendicular to the axis of the radial combustor means.

As previously mentioned, the radially extending walls of the radial combustor means define the necked down region at radially inward extremes adjacent the turbine nozzle means. The gases of combustion thus follow the generally radial flow path radially inwardly to the necked down region after which they are diverted at the necked down region to a generally axial flow path leading to the turbine nozzle means and then axially to the axial turbine means. Still additionally, the gas turbine engine may include an axially extending shaft through which the axially turbine means is adapted to drive the radial compressor means.

Other objects, advantages and features of the present invention will become apparent from a consideration of the following specification taken in conjunction with the accompanying drawings.

BRIEF DESCRIPTION OF THE DRAWINGS

FIG. 2 is an enlarged cross sectional view of a radial combustor as illustrated in FIG. 1;

FIG. 3 is a cross sectional view taken on the line 3—3 of FIG. 2;

FIG. 3A is a view similar to FIG. 3 illustrating an alternative embodiment; and

FIG. 4 is a cross sectional view of an alternative radial combustor of the type illustrated in FIG. 1.

DETAILED DESCRIPTION OF THE PREFERRED EMBODIMENTS

Figure 1:
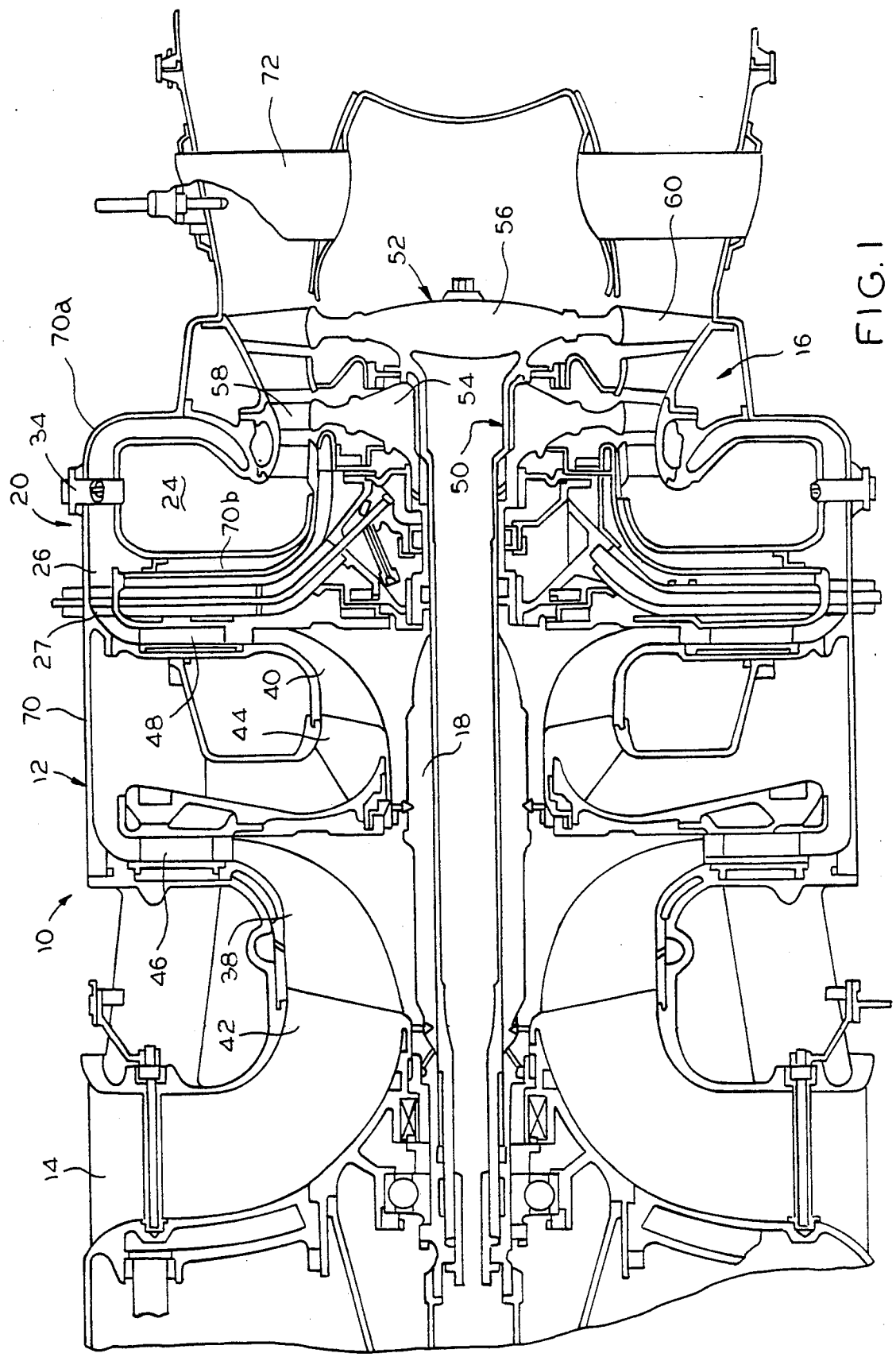
FIG. 1 is a cross sectional view of a gas turbine engine in accordance with the present invention.

An exemplary embodiment of a gas turbine engine of the axial flow type having a radial combustor in accordance with the invention has been illustrated. It will be appreciated that, by way of example, the gas turbine engine could be of the split or fixed shaft type. However, the invention is not limited to any particular type of turbine but may have applicability to any form of gas turbine engine.

Referring to FIG. 1, the reference numeral 10 designates generally a gas turbine engine in accordance with the present invention. It will be appreciated that the gas turbine engine 10 illustrated is of the axial flow type and includes a radial compressor generally designated 12 for compressing air entering through a compressor inlet opening 14 and an axial turbine generally designated 16 operatively associated with the radial compressor 12 for driven movement of the compressor through a common shaft 18. Also as shown, the gas turbine engine 10 includes a radial combustor generally designated 20 which is disposed intermediate the radial compressor 12 and axial turbine 16.

Referring to both of FIGS. 1 and 2, a turbine nozzle 22 is provided proximate the axial turbine 16 for directing gases of combustion thereto. The radial combustor 20 defines a radial combustion space 24 where the gases of combustion are generated by combusting fuel from a conventional source (not shown) and air from the radial compressor 12. For this reason, the radial combustion space 24 is in communication with the radial compressor 12 as through passageway 26 which may typically include deswirl vanes as at 27 to ensure axial flow toward the radial combustor 20 and ultimately to the radial combustion space 24, and it will also be appreciated that the radial combustion space 24 is in communication with the turbine nozzle 22 as at the necked down portion 28 of the radial combustor 20. The gases of combustion generated in the radial combustion space 24 can therefore be directed through the turbine nozzle 22 to the axial turbine 16. With this arrangement, the radial combustor 20 is provided with an inlet 30 to admit compressed air flowing through the passageway 26 into the radial combustion space 24.

As will be described hereinafter, the compressed air inlet 30 is preferably adapted to admit a mixture of compressed air and fuel into the radial combustion space 24 where the mixture is combusted to generate the hot gases of combustion. These gases are then directed through the turbine nozzle 22 for driving the axial turbine 16. As shown, the turbine nozzle 22 is disposed radially inwardly of the radial combustion space 24 to define a generally radial flow path for the fuel/air mixture and the hot gases of combustion as generally represented by the arrow 32.

Referring to FIGS. 1 through 3, the gas turbine engine 10 advantageously includes fuel injection means in the form of a fuel injector 34 associated with the radial combustor 20 radially outwardly of the turbine nozzle 22 for not only admitting fuel but also defining what has previously been described as the compressed air inlet 30. Preferably, a plurality of such fuel injectors 34 are mounted in circumferentially spaced relation in a generally cylindrical wall 36 of the radial combustor 20 so as to be in a common plane extending generally perpendicular to an axis of the radial combustor 20 defined by the shaft 18. Alternatively, and referring to FIG. 4, the fuel injectors 34 may be disposed in two axially spaced planes in the generally cylindrical wall 36 which is particularly advantageous for improving high altitude ignition and/or reducing combustor size.

As shown, the radial compressor 12 preferably includes a first radial inflow compressor stage 38 and a second radial inflow compressor stage 40. The compressor inlet opening 14 is in communication with a compressed air inlet 42 of the first radial inflow compressor stage 38 to supply air thereto whereas the second radial inflow compressor stage 40 has a compressed air inlet 44 for receiving compressed air from a compressed air outlet 46 of the first radial inflow compressor stage 38. Additionally, the radial compressor 12 is formed such that the second radial inflow compressor stage 40 has a compressed air outlet 48.

With this arrangement, the fuel injectors 34 are such that the compressed air inlets 30 are in communication with the compressed air outlet 48 of the second radial inflow compressor stage 40. More specifically, the compressed air inlets 30 of the fuel injectors 34 communicate directly with the passageway 26 to receive compressed air from the second radial inflow compressor stage 40. In addition, the fuel injectors 34 are such that fuel from the source is delivered for mixing with the compressed air in the compressed air inlets 30 so the fuel/air mixture can be combusted in the radial combustion space 24.

Still referring to FIG. 1, the axial turbine 16 includes a first axial turbine stage generally designated 50 and a second axial turbine stage generally designated 52. It will be seen that the first axial turbine stage 50 is in communication with the radial combustion space 24 through the turbine nozzle 22 for receiving the gases of combustion from the radial combustion space 24 for driven movement of the first axial turbine stage 50. It will also be seen that the second axial turbine stage 52 is in communication with the first axial turbine stage 50 for receiving the gases of combustion from the radial combustion space 24 downstream of the first axial turbine stage 50 for driven movement of the second axial turbine stage 52. As shown, the first and second axial turbine stages 50 and 52 each include a turbine wheel 54 and 56, respectively, each of which has a rotor blade 58 and 60, respectively.

With the embodiment as illustrated, the turbine wheels 54 and 56 are disposed on the common shaft 18 along with the radial compressor 12. Thus, since the turbine wheels 54 and 56 and the radial compressor 12 are mounted so as to be integral with the shaft 18, as the hot gases of combustion drive the turbine wheels 54 and 56, the radial compressor 12, including both the first and second radial inflow stages 38 and 40, are driven through the shaft 18. In other words, the radial compressor 12 is in coaxial spaced relation to the turbine wheels 54 and 56 which are driven by axial flow of the gases of combustion through the rotor blades 58 and 60.

Referring once again to both of FIGS. 1 and 2, the radial combustor 20 includes a pair of axially spaced radially extending walls 62 and 64 joined at radially outward extremes by the generally cylindrical wall 36 where the fuel injectors 34 are mounted for injecting a mixture of fuel from the source with air from the radial compressor 12 in a generally tangential direction into the radial combustion space 24. The radially extending walls define the necked down region 28 at radially inward extremes adjacent the turbine nozzle 22. In addition, as shown in FIG. 3, the gas turbine engine 10 includes means for tangentially introducing dilution air into the radial combustion space 24 in the form of a plurality of dilution air inlets 66 opposite each of the cooling strips 67 on the cylindrical wall 36 and the radially extending walls 62 and 64 for cooling the walls 36, 62 and 64 as well as the gases of combustion before they are directed to the axial turbine 16.

As previously mentioned, deswirl vanes 27 may commonly be employed to deswirl air from the radial compressor 12 to provide axial flow in the passageway 26. However, it should be appreciated that the airflow injection into the radial combustor 20 is primarily tangential as through the compressed air inlets 30 of the fuel injectors 34 and through the dilution air inlets 66 opposite each of the cooling strips 67. Hence, the radial combustor 20 is tolerant of inlet swirl flow, and in fact may have high inlet swirl, making it possible to entirely eliminate deswirl vanes.

Referring to FIG. 3a, an alternative embodiment of radial combustor generally designed 20' has been illustrated for purposes of comparison with FIG. 3. It will be noted that the radial combustor 20' includes a plurality of inlets 30' for introducing compressed air into the radial combustion space 24' and, in particular, the compressed air inlets 30' are separate from a plurality of fuel injectors 34', i.e., the compressed air inlets 30' are mounted in alternating circumferentially spaced (and tangentially directed) relation to the fuel injectors 34' in the generally cylindrical wall 36' of the radial combustor 20' so as to be in a common plane extending generally perpendicular to an axis of the radial combustor 20'. As in FIG. 3, it will be seen that both the fuel and air are injected generally tangentially (although separately) into the radial combustion space 24'.

With respect to the embodiments in both FIGS. 3 and 3a, the air entering tangentially into the radial combustion space 24 or 24' rapidly accelerates in free vortex flow as it approaches the turbine nozzle 22 or 22'. However, the heavy fuel droplets, which are much more dense than the air and flame within the radial combustion space 24 or 24', will tend to be constrained from moving inward; thus, until the fuel is evaporated and mixed it cannot move radially inwardly.

As a result, it will be understood that an automatic means of enhanced fuel evaporation is achieved which is advantageous for marginal operating conditions. As the time for fuel evaporation is fixed while the time for combustion is proportionate to the size of the radial combustor 20, evaporation is most efficient in smaller combustors. Similarly, difficult to evaporate fuels are more rapidly evaporated in this unique radial combustor 20 particularly in the smaller sizes thereof.

Because of the higher "G" forces at the turbine nozzle 22, the lighter, less dense combustion products will be forced radially inwardly. On the other hand, the heavier, more dense and cooler mixture of air and fuel will be constrained not to move radially inwardly. Hence, a higher combustion efficiency will be achieved particularly in marginal operating conditions and especially at high altitudes.

As shown in FIGS. 1 and 2, the radial combustor 20 is generally in the form of an annular chamber which incorporates the radial combustion space 24 in a radially expanded and axially shortened combustor configuration. That is to say that the radially extending wall 62 is greater in length than the generally cylindrical wall 36. In this manner, the gas turbine engine 10 takes full radial advantage of the existing engine envelop while minimizing the axial length to thereby also provide a relatively significant reduction in size and weight.

As shown in FIG. 1, the gas turbine engine 10 includes a housing generally designated 70 which defines a combustor housing 70a. The combustor housing 70a is in the region of the radial combustor 20, and it is spaced from and substantially entirely surrounds the generally cylindrical wall 36 and radially extending 64. Further, an interior combustor housing wall 70b is provided in spaced relation to the radially extending wall 62.

With this arrangement, a dilution air flow path is defined which is in communication with the radial compressor 12 for receiving compressed air therefrom. This compressed air then flows between the housing wall 70a on the one hand and the generally cylindrical wall 36 and radially extending wall 64 on the other as well as between the housing wall 70b on the one hand and the radially extending wall 62 on the other. In other words, the dilution air flow path leads over all of the generally cylindrical and radially extending walls 36, 62 and 64 to channel dilution air for cooling thereto.

By referring to FIG. 3, it will be appreciated that the fuel injectors 34 inject fuel and compressed air generally tangentially along a path such as 72 into the radial combustion space 24. Also, and as will be appreciated by referring to FIG. 3, a conventional igniter or igniters 73 will be mounted in the radial combustor 20 to cause the combustion of the fuel/air mixture.

Referring once again to FIG. 1, the outer housing 70 substantially entirely encloses the radial compressor 12, axial turbine 16 and radial combustor 20. Further, the generally cylindrical wall 36 and radially extending wall 64 are disposed in spaced generally parallel relation to the outer housing wall 70a whereas the radially extending wall 62 is disposed in spaced generally parallel relation to the inner housing wall 70b. In this manner, compressed air readily flows from the radial compressor 12 through the passageway 26 to the dilution air inlets 66 and to the compressed air inlets 30 in the fuel injectors 34.

As will be appreciated by referring to any of FIGS. 1, 2 and 4, the gases of combustion will follow the generally radial flow path 32 spiralling radially inwardly to the necked down region 28 of the radial combustor 20. When the gases of combustion reach the necked down region 28, they are diverted to a generally axial flow path leading to the turbine nozzle 22 and then axially to the axial turbine 16, i.e., to the blades 58 and 60 of the first and second axial turbine stages 50 and 52, respectively. After the gases of combustion pass through the first and second axial turbine stages 50 and 52, they exit the gas turbine engine 10 through an exhaust duct 72.

Comparing FIGS. 2 and 4, it will be noted that the two radial combustor configurations 20 and 20" differ in one significant respect. More specifically, the length of the generally cylindrical wall 36" in FIG. 4 is greater than the length of the corresponding generally cylindrical wall 36 in FIG. 2 so as to accommodate two rows of fuel injectors 34, i.e., two rows of circumferentially spaced fuel injectors 34 disposed in two spaced planes both of which are perpendicular to the axially extending shaft 18. However, the radially extending walls 62 and 64 will be identical in radial length in both embodiments.

One further difference involves the respective turned in portions 74 and 74". It will be noted that the turned in portion 74" in FIG. 4 forms a deeper recess to thereby define the necked down portion 28. This is attributable to the increased length of the generally cylindrical wall 36.

Among other advantages of the present invention is the permissible configuration of the rotor blades 58 and 60. The high swirl at the turbine nozzle 22 means that the rotor blades 58 and 60 need less turning. As a result, the rotor blades 58 and 60 are more compact, easier to cool and provide greater turbine efficiency.

Among still other features of the present invention is the conservation of angular momentum which results in a reduced pressure drop for a given combustor volume. Similarly, it is advantageous for the cooling strips to cover all of the surfaces whereby compressed air is injected at high velocity in the direction of swirl. If desired, it is within the capabilities of the present invention to provide less cooling strips at the radially inward positions.

While in the foregoing there have been set forth preferred embodiments of the invention, it will be appreciated that the invention is only to be limited by the true spirit and scope of the appended claims.

We claim:

1. A gas turbine engine, comprising
    radial compressor means for compressing air entering through a compressor inlet opening;
    axial turbine means in axially spaced relation to said radial compressor means;
    said radial compressor means being operatively associated with said axial turbine means;
    radial combustor means intermediate said radial compressor means and axial turbine means;
    turbine nozzle means proximate said axial turbine means for directing gases of combustion thereto;
    said radial combustor means defining a radial combustion space in communication with both said radial compressor means and said turbine nozzle means, said radial combustor means including means for introducing compressed air generally tangentially into said radial combustion space upstream of said turbine nozzle means and at a point radially outwardly of said turbine nozzle means and said turbine nozzle means being disposed radially inwardly of said radial combustion space to define a generally radial flow path therebetween, said radial combustor means generating said gases of combustion by combusting fuel from a source and air from said radial compressor means; and
    fuel injection means operatively associated with said radial combustor means radially outwardly of said turbine nozzle means for injecting a fuel/air mixture generally tangentially into said radial combustion space;
    whereby a tangential swirl flow is established within said radial combustion space.

2. The gas turbine engine as defined in claim 1 wherein said radial compressor means includes at least a first radial inflow compressor stage, said compressor inlet opening being in communication with a compressed air inlet of said first radial inflow compressor stage to supply air thereto, said first radial inflow compressor stage also having a compressed air outlet.

3. The gas turbine engine as defined in claim 2 wherein said said radial compressor means includes a second radial inflow compressor stage, said second radial inflow compressor stage having a compressed air inlet for receiving compressed air from said compressed air outlet of said first radial inflow compressor stage, said second radial inflow compressor stage also having a compressed air outlet.

4. The gas turbine engine as defined in claim 3 wherein said means for introducing compressed air includes a compressed air inlet in communication with said compressed air outlet of said second radial inflow compressor stage to direct compressed air from said second radial inflow compressor stage for combustion in said radial combustion space with fuel from said source.

5. The gas turbine engine as defined in claim 1 wherein said axial turbine means includes at least a first axial turbine stage in communication with said radial combustion space through said turbine nozzle means for receiving said gases of combustion from said radial combustion space for driven movement of said first axial turbine stage of said axial turbine means.

6. The gas turbine engine as defined in claim 5 wherein said axial turbine means includes a second axial turbine stage in communication with said first axial turbine stage for receiving said gases of combustion from said radial combustion space downstream of said first axial turbine stage for driven movement of said second axial turbine stage of said axial turbine means.

7. The gas turbine engine as defined in claim 6 wherein said first and second axial turbine stages each include a turbine wheel, said turbine wheels each having a rotor blade and being disposed on a common shaft with said radial compressor means in coaxial spaced relation to one another, said turbine wheels being driven by axial flow of said gases of combustion through s id rotor blades.

8. The gas turbine engine as defined in claim 1 wherein said radial combustor means includes a pair of axially spaced radially extending walls joined at radially outward extremes by a generally cylindrical wall wherein said fuel injection means is mounted for injecting fuel from said source generally tangentially into said radial combustion space.

9. The gas turbine engine as defined in claim 8 wherein said radially extending walls define a necked down region at radially inward extremes adjacent said turbine nozzle means, said means for introducing compressed air into said radial combustion space including means for introducing dilution air generally tangentially into said radial combustion space upstream of said turbine nozzle means to cool said gases of combustion.

10. The gas turbine engine as defined in claim 9 wherein said means for introducing dilution air into said radial combustion space includes a plurality of dilution air inlets in at least said radially extending walls, said generally cylindrical wall also including a plurality of inlets defining said means for introducing compressed air into said radial combustion space for combustion with fuel from said source.

11. The gas turbine engine as defined in claim 8 wherein said means for introducing compressed air into said radial combustion space also includes a compressed air inlet integral with each of said fuel injection means.

12. A gas turbine engine, comprising:
    radial compressor means for compressing air entering through a compressor inlet opening;
    axial turbine means in axially spaced relation to said radial compressor means;
    said radial compressor means being operatively associated with said axial turbine means;

radial combustor means intermediate said radial compressor means and axial turbine means;

turbine nozzle means proximate said axial turbine means for directing gases of combustion thereto;

said radial combustor means defining a radial combustion space in communication with both said radial compressor means and said turbine nozzle means, said radial combustor means including means for introducing compressed air generally tangentially into said radial combustion space upstream of said turbine nozzle means and at a point radially outwardly of said turbine nozzle means and said turbine nozzle means being disposed radially inwardly of said radial combustion space to define a generally radial flow path therebetween, said radial combustor means generating said gases of combustion by combusting fuel from a source and air from said radial compressor means; and a fuel injector operatively associated with said radial combustor means radially outwardly of said turbine nozzle means;

said radial combustor means including a pair of axially spaced radially extending walls joined at radially outward extremes by a generally cylindrical wall to define an annular combustion chamber, said fuel injector being mounted in said generally cylindrical wall for injecting a mixture of fuel from said source and air generally tangentially into said radial combustion space within said annular combustion chamber, said radial combustor means also including a combustor housing spaced from and substantially entirely surrounding said generally cylindrical and radially extending walls to define a dilution air flow path;

said dilution air flow path being in communication with said radial compressor means for receiving compressed air therefrom, at least said radially extending walls having dilution air inlets leading to said annular chamber, said dilution air flow path leading over all of said generally cylindrical and radially extending walls;

whereby a tangential swirl flow is established within said radial combustion space.

13. The gas turbine engine as defined in claim 12 including a plurality of fuel injectors mounted in circumferentially spaced relation in said generally cylindrical wall, said circumferentially spaced fuel injectors being disposed in a common plane extending generally perpendicular to an axis of said radial combustor means.

14. The gas turbine engine as defined in claim 12 including a plurality of fuel injectors mounted in circumferentially and axially spaced relation in said generally cylindrical wall, said circumferentially and axially spaced fuel injectors being disposed in two axially spaced planes extending generally perpendicular to an axis of said radial combustor means.

15. A gas turbine engine, comprising:

radial compressor means for compressing air entering through a compressor inlet opening;

axial turbine means in axially spaced relation to said radial compressor means;

said radial compressor means being operatively associated with said axial turbine means;

radial combustor means intermediate said radial compressor means and axial turbine means;

turbine nozzle means proximate said axial turbine means for directing gases of combustion thereto;

said radial combustor means defining a radial combustion space in communication with both said radial compressor means and said turbine nozzle means, said radial combustor means including means for introducing compressed air generally tangentially into said radial combustion space upstream of said turbine nozzle means and at a point radially outwardly of said turbine nozzle means and said turbine nozzle means being disposed radially inwardly of said radial combustion space to define a generally radial flow path therebetween, said radial combustor means generating said gases of combustion by combusting fuel from a source and air from said radial compressor means;

fuel injection means operatively associated with said radial combustor means radially outwardly of said turbine nozzle means; and an outer housing substantially entirely enclosing said radial compressor means, axial turbine means and radial combustor means;

said radial combustor means including a pair of axially spaced radially extending walls joined at radially outward extremes by an axially extending generally cylindrical wall so as to define an annular combustion chamber, said fuel injection means being operatively associated with said generally cylindrical wall for injecting a mixture of fuel from said source and air generally tangentially into said radial combustion space within said annular combustion chamber, said radial combustor means also being formed such that said generally cylindrical wall is disposed in spaced parallel relation to said outer housing and including a further inner housing in spaced parallel relation to at least one of said radially extending walls;

said housings and walls defining a dilution air flow path in communication with said radial compressor means for receiving compressed air therefrom, at least said radially extending walls having dilution air inlets leading to said annular chamber, said dilution air flow path leading over all of said generally cylindrical and radially extending walls;

whereby a tangential swirl flow is established within said radial combustion space.

16. The gas turbine engine as defined in claim 15 wherein said fuel injection means comprises a plurality of fuel injectors mounted in circumferentially spaced relation in said generally cylindrical wall, said circumferentially spaced fuel injectors being disposed in a common plane extending generally perpendicular to an axis of said radial combustor means.

17. The gas turbine engine as defined in claim 15 wherein said fuel injection means comprises a plurality of fuel injectors mounted in circumferentially and axially spaced relation in said generally cylindrical wall, said circumferentially and axially spaced fuel injectors being disposed in two axially spaced planes extending generally perpendicular to an axis of said radial combustor means.

18. The gas turbine engine as defined in claim 15 wherein said radially extending walls define a necked down region at radially inward extremes adjacent said turbine nozzle means, said dilution air inlets being arranged so as to introduce dilution air generally tangentially into said radial combustion space upstream of said turbine nozzle means to cool said gases of combustion.

19. The gas turbine engine as defined in claim 18 wherein said gases of combustion follow said generally radial flow path radially inwardly to said necked down region, said gases of combustion being diverted at said necked down region to a generally axial flow path leading to said turbine nozzle means and then to said axial turbine means.

20. The gas turbine engine as defined in claim 15 including an axially extending shaft, said radial compressor means and axial turbine means being integral with said axially extending shaft, said axial turbine means being adapted to drive said radial compressor means through said axially extending shaft.

* * * * *

UNITED STATES PATENT AND TRADEMARK OFFICE
CERTIFICATE OF CORRECTION

PATENT NO. : 4,993,220

DATED : February 19, 1991

INVENTOR(S) : Ken W. Sawyer and Jack R. Shekleton

It is certified that error appears in the above-identified patent and that said Letters Patent is hereby corrected as shown below:

ON TITLE PAGE: Item [75]
The order of inventors should be as follows:

Ken W. Sawyer, Escondido; Jack R. Shekleton, San Diego, both of Calif.

Item [19] should read "Sawyer et al ".

Signed and Sealed this

Fifteenth Day of September, 1992

*Attest:*

DOUGLAS B. COMER

*Attesting Officer*     *Acting Commissioner of Patents and Trademarks*